United States Patent [19]
Jansen et al.

[11] 4,329,579
[45] May 11, 1982

[54] TARGET SEEKING DEVICE

[75] Inventors: Dirk Jansen; Friedrich Keller, both of Überlingen, Fed. Rep. of Germany

[73] Assignee: Bodenseewerk Geratetechnik GmbH, Uberlingen, Fed. Rep. of Germany

[21] Appl. No.: 152,221

[22] Filed: May 22, 1980

[30] Foreign Application Priority Data

Jun. 9, 1979 [DE] Fed. Rep. of Germany ....... 2923547

[51] Int. Cl.³ ............................................. G05D 1/12
[52] U.S. Cl. ................................ 250/203 R; 356/141
[58] Field of Search ................. 250/203; 356/141, 152

[56] References Cited

FOREIGN PATENT DOCUMENTS 1406578 5/1974 Fed. Rep. of Germany.
1355327 6/1974 United Kingdom.

Primary Examiner—David C. Nelms
Assistant Examiner—Darwin R. Hostetter
Attorney, Agent, or Firm—Howard H. Darbo

[57] ABSTRACT

A target seeking device having a gyro rotor rotating about its axis with two degrees of freedom about a central point of rotation. The device includes a detector fixed with respect to the housing of the device, an optical system by which the field of view of the device is imaged in the plane of the detector, means for producing relative motion between the field of view image and the detector, a signal evaluating circuit, means for producing precession motion of the gyro rotor, and position sensors which respond to the angular position of the gyro rotor relative to the housing. A torquer is provided for receipt of scanning signals. The signals of the position sensors are applied to the torquer through a feedback loop. An evaluation circuit is provided for producing follow-up signals from the detector signals and the position sensor signals.

8 Claims, 8 Drawing Figures

TARGET SEEKING DEVICE

The invention relates to a target seeking device, comprising a gyro rotor rotating about its geometrical axis, which rotor is mounted in a way permitting a angular motion of the geometrical axis with two degrees of freedom about a central point of rotation, a detector arranged stationary with respect to the housing in the central point of rotation, an optical system arranged on the gyro rotor, by which a field of view of the seeker located in infinity is imaged as field of view image in the plane of the detector, means for producing a relative motion between field of view image and detector, a signal evaluating circuit to which the detector signals are applied and which is designed to produce follow-up signals as a function of the target deviation, means for producing a precession motion of the gyro rotor, to which means the follow-up signals are applied for readjusting the gyro rotor to a target, and position sensors, which respond to the angular position of the geometrical axis of the gyro rotor relative to the housing.

Such a target seeking head is known, for example, by German Pat. No. 1 406 578.

In the prior art target seeking head the gyro rotor is universally angularly movable and mounted on a central supporting member for rotation about its spin axis. It is mounted, for example, by means of a gimbal arrangement with ball bearings. The gyro rotor carries a target field scanning device, which comprises an optical system in the form of a folded mirror optics with an annular concave mirror and a plane mirror. A field of view located in infinity is imaged by the concave mirror, over the plane mirror in an image plane. A modulation disc (reticle) rotating with the gyro rotor is located in the image plane. A detector responding to the radiation of a target to be followed is arranged on the central supporting member and is exposed to the radiation passing through the modulation disc. The gyro rotor with the target field scanning device is arranged at the tip of a missile, which tip is closed by a radiation transparent dome.

In the prior art target seeking head the gyro rotor is radially magnetized and surrounded by an annular coil. The signals of the detector are amplified and applied to the annular coil and exert torques on the radially magnetized gyro rotor, by which torques the spin axis of the gyro rotor and therewith the optical axis of the target field scanning device are precessed to a target and caused to follow this target continuously. The signals applied to the annular coil are at the same time applied to the control system of the missile.

By the gyro rotor interfering motions of the missile are neutralized at the target field scanning device. The target field scanning device operating with a rather narrow field of view is aligned to a target and continuously caused to follow the target. The signals applied to the annular coil and to the control system are proportional to the angular speed of the sight line in space, as it is required for proportional navigation. The gyro rotor is for example accelerated to its operational speed of rotation by blowing gas under preasure against it and then runs freely down during the flight of the missile.

In the embodiment of German Pat. No. 1 406 578, position sensors are provided, which respond to the angular position of the gyro rotor relative to the housing, that is to the missile. In this embodiment the signals of the position sensors are applied to the control system of the missile. With that the control signals try to align the missile longitudinal axis with the sight line to the target. This results in a more unfavorable control performance than with proportional navigation, as it is obtained with other embodiments of German Pat. No. 1 406 578.

An arrangement, with which the field of view is scanned by means of a modulation disc, permits just recognizing of substantially point-shaped targets. With larger extension of the target area and heavily structured background it becomes difficult to recognize the target. Intelligent image evaluating methods, such as pattern recognition, cannot be used.

Image field scanning devices are known in which an areal detector is composed of a raster of single detector elements. The field of view of the seeker located in infinity is imaged on this areal "multi-element detector" by an optical system.

Such image field scanning devices comply with all demands made with respect to the image processing. But they are very expensive. The optical system has to image sharply the whole field of view of the seeker to the edge at the same time. Rather high demands are made upon the imaging qualaties of the optical system. The multi-element detector is very expensive to manufacture. It has a large thermal mass. Thereby it is difficult to cool the multi-element detector down fast enough, when it is cooled to improve the signal-to-noise ratio. A further disadvantage of an image field scanning device with multi-element detector is, that the signal processing requires a large number of parallel channels.

Furthermore image field scanning devices are known, at which a "single element detector" designed with a single detector element is provided and the field of view of the seeker is scanned through movable optical members.

In the simplest case, in the arrangement as set forth in the German Pat. No. 1 406 578, the plane mirror of the optical system rotating with the gyro rotor is formed as a nutating mirror, which is inclined a little relative to the axis of rotation. Thereby the field of view image executes a rotary motion. When a target is located on the geometrical or rotary axis of the gyro rotor, the target image moves in a circle symmetrically around the stationary single element detector. If the target deviates from this geometrical or rotary axis of the gyro rotor, thus the rotary motion of the target picture becomes unsymmetrical with respect to the single element detector and this detector supplies an alternating current signal, of which the amplitude and phase provide the amount and direction, respectively, of the target deviation.

Such a way of scanning is rather primitive. It is only usable, when the target is located rather close the geometrical or rotary axis of the gyro rotor. Interference by structured background cannot be excluded. Image evaluating methods cannot be used.

Furthermore it is known to scan the field of view of the seeker in two dimensions with a single element detector. Therefor two independent scanning motions for example with vibrating mirrors or something like that have to be realised. One of these scanning motions can be the rotary motion of the gyro rotor. Nevertheless an extra scanning motion is required. Prior art constructions of this type are of mechanically or optically complicated design.

It is the object of the invention to enable with simple means well-defined pointwise scanning of a field of view of a seeker, in an target seeker head defined above.

According to the invention this object is achieved in that
(a) a torquer acting on the gyro rotor is provided as means for producing a relative motion between field of view image and detector, to which torquer scanning signals of a scanning signal generator are applied and which exerts torques on the gyro rotor, the gyro rotor under the influence of said torques executing a motion scanning the fiel of view of the seeker,
(b) the signals of the position sensors resulting from this motion are applied to a torquer through a feed-back loop and
(c) the signals of the position sensors together with the detector signals are applied to the signal evaluating circuit for producing the follow-up signals.

The field of view of the seeker is scanned pointwise, according to the invention, in that the geometrical axis of the gyro rotor itself executes the scanning motion. For this purpose appropriate scanning signals are applied to the torquer. The reaction of the gyro rotor to the scanning signals and to a certain extent, the "adress" of the detector signal obtained at the same time is measured by means of the position sensors. The detector signal with the associated address is supplied to the signal evaluating circuit. This signal evaluating circuit produces follow-up signals after scanning the field of view of the seeker, which signals readjust the gyro rotor and the optical system to a target. Herein prior art picture evaluating methods, for example pattern recognition can be used. A well-defined scanning motion is achieved by feeding the signals of the position sensors back to the torquer through an appropriate feedback loop.

Further modifications of the invention are subject matter of the sub-claims.

An embodiment of the invention will now be described in greater detail with reference to the accompanying drawings.

Figure 1:
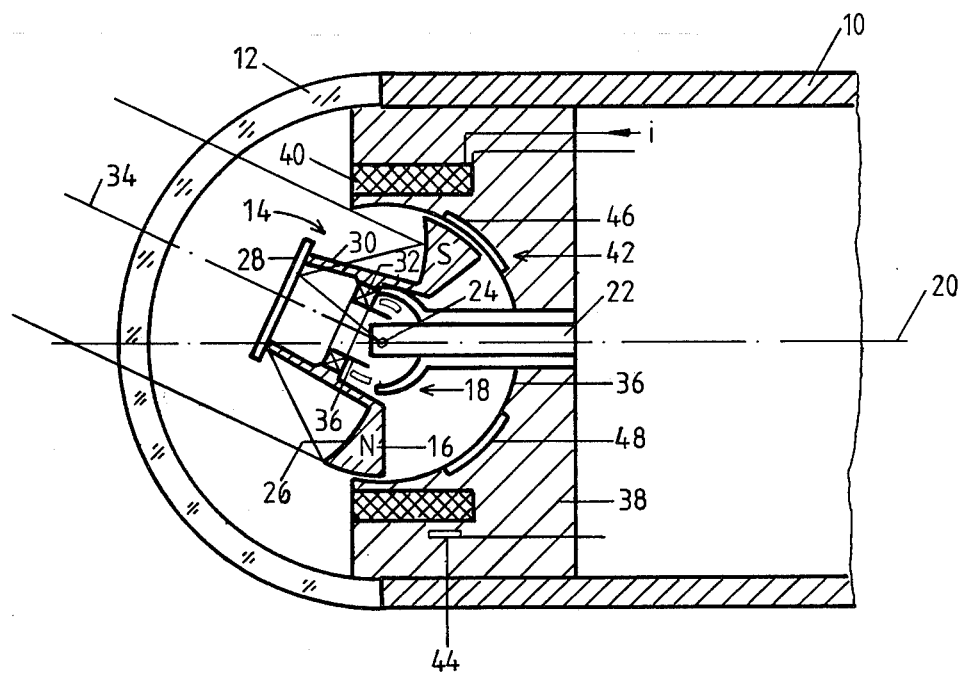
FIG. 1 shows schematically a longitudinal sectional view of the front portion of a missile with a target seeking head.

In FIG. 1 numeral 10 designates a missile, which here represents the "housing". At the front end the missile 10 is closed by a dome 12. A target seeking head 14 is located behind the dome 12.

The target seeking head 14 comprises an annular gyro rotor 16, which is mounted on a central supporting member 22 through a central gimbal arrangement 18, universally angularly movable about a point of rotation located on the missile longitudinal axis 20. A detector 24 designed as single element detector is located on a supporting member 22 in the point of rotation. A field of view (instantaneous field of view) located in infinity is imaged on the detector 24 by an optical system comprising an annular concave mirror 26 and a plane mirror 28.

Expressed otherwise: the instantaneous field of view is the image of the detector 24 produced by the optical system 28, 26 in infinity. The concave mirror 26, which preferably is a parabolic mirror, is formed by the target side of the gyro rotor 16. The plane mirror 28 is mounted on the gyro rotor 16 through supports 30. The gyro 16 is mounted in the innermost gimbal ring 36 of the gimbal arrangement 18, for rotation about its geometrical axis 34 through a ball bearing 32. This geometrical axis 34 also is the optical axis of the optical system formed by the concave mirror 26 and the plane mirror 28.

The gyro rotor 16 has a spherical surface and is arranged in a concave-spherical recess 36 of an intermediate wall 38. The intermediate wall 38 extends perpendicular to the missile longitudinal axis 20. An annular coil 40, which is arranged coaxially to the missile longitudinal axis 20 and which surrounds the gyro rotor 16, is located in the intermediate wall 38. The gyro rotor 16 is diametrally magnetized.

The position of the gyro rotor 16 relative to the missile 10 is scanned by a first position sensor 42 and a second position sensor 44. The first position sensor 42 responds to the angle, which the geometrical or rotary axis 34 of the gyro rotor 16 forms with the missile longitudinal axis. The second position sensor 44 responds to the rotary angle of the gyro rotor 16 about its geometrical axis 34. The first position sensor 42 has a pair of electrically conducting plates 46, 48 arranged symmetrically to the missile longitudinal axis 20 on the inner surface of the recess 36, which plates form a capacitor each with the peripheral surface of the gyro rotor 16. The capacities of the two capacitors are equal in the central position of the gyro rotor 16, when the geometrical axis 34 coincides with the missile longitudinal axis 20, whereas the capacity of one capacitor increases and the capacity of the other capacitor decreases with a deviation of the geometrical axis 34. The two capacitors form portion of a capacitative pick-off in conventional manner. The second position sensor 44 can be magnetic field sensitive element, for example a Hall generator, such that a periodic phase reference signal with the rotational frequency of the gyro rotor 16 is produced by the diametral magnetization of the gyro rotor 16.

Figure 6:
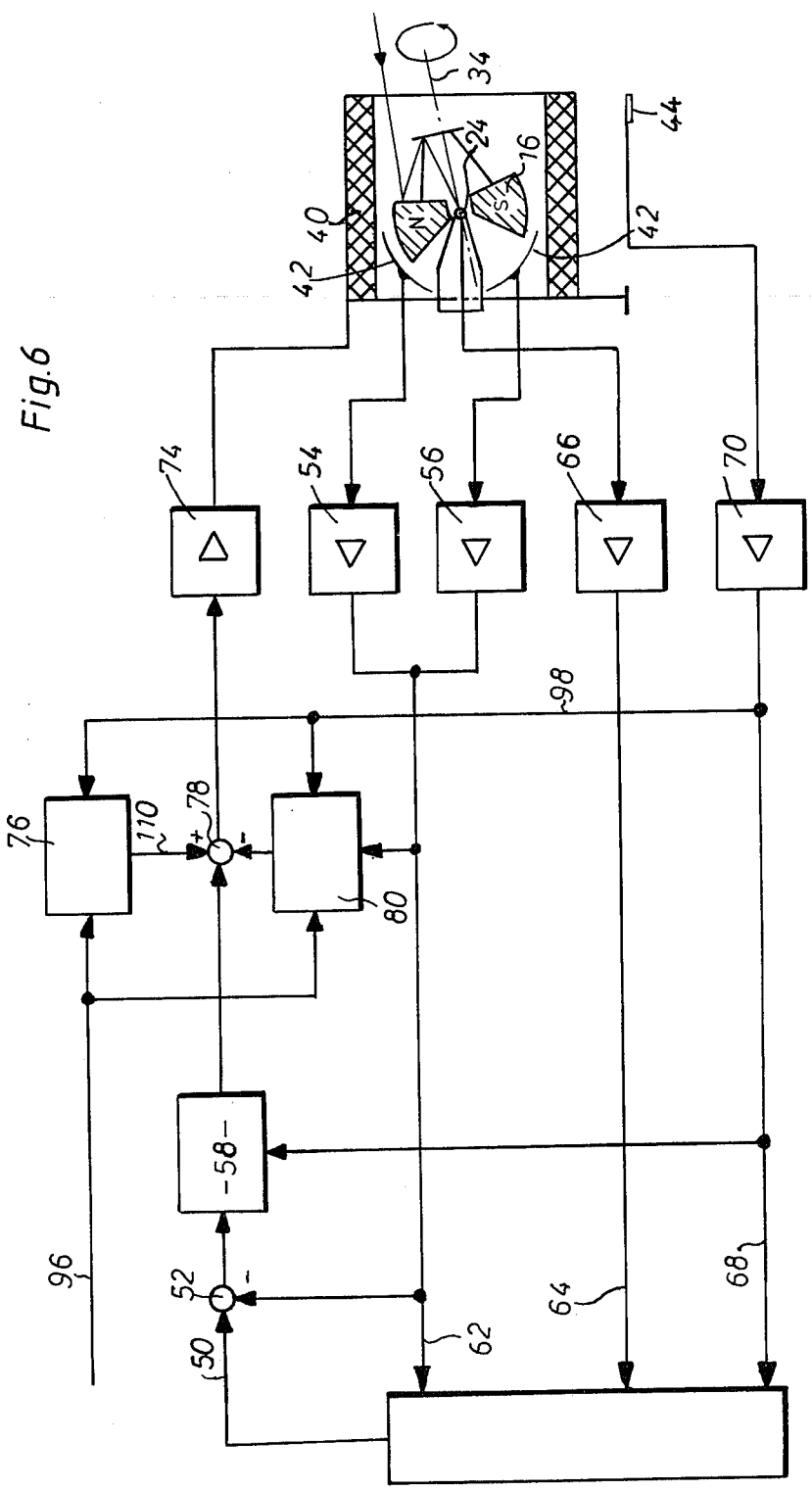
FIG. 6 is a block circuit diagram of the target seeking head with the associated electronics.

As can be seen from FIG. 6, a follow-up or command signal is applied to the input 50, which signal commands a certain position of the gyro rotor 16. The signal of the first position sensor 42 is connected in opposition to the command signal at a summing point 52 through amplifiers 54, 56. The difference signal obtained is applied to a controller 58, which tries to align the geometrical axis 34 of the gyro rotor 16 and therewith the optical axis of the target seeking head 14 into the commanded position by a signal onto the annular coil 40. The follow-up or command signal is provided, as illustrated, by a signal evaluating circuit 60. The signal from the first position sensor 42 is applied to the signal evaluating circuit 60 at an input 62, the detector signal from the detector 24 is applied to the signal evaluating circuit 60 through an amplifier 66 at a second input 64, and the phase reference signal from the second position sensor 44 is applied to the signal evaluating circuit 60 at a third input 68 through an amplifier 70.

The controller 58 also receives the phase reference signal from the second position sensor 44 at an input 72. The controller 58 is designed to produce pulselike or harmonic signals of well-defined phase relation to the phase reference signal. This phase relation depends on the direction of the target deviation. The output signal of the controller 58 is applied through an amplifier 74 to the annular coil 40. It produces in known manner a magnetic field parallel to the missile longitudinal axis 20, which interacts with the diametral magnetization of the gyro rotor 16 and which exerts a torque thereon. The phase position or the moment when this magnetic field is produced with reference to the rotation of the gyro rotor 16, is selected such that the geometrical axis 34 of the gyro rotor 16 precesses to the target.

A scanning motion is superposed to this follow-up motion, which causes the narrow instantaneous field of view to scan periodically over a larger field of view of the seeker. This scanning motion of the gyro rotor 16 is initiated by a scanning signal generator 76, which provides a scanning signal. The scanning signal is superposed to the output signal of the controller 58 at a summing point 78. A feedback signal from a feedback loop 80 is connected in opposition to the scanning signal, the signals from the first and the second position sensors 42 and 44, respectively, being supplied to said feedback loop.

The scanning signal generator 76 and the feedback loop 80 are also designed to produce pulse-like or harmonic signals in well-defined phase relation to the phase reference signals.

The scanning signal generator 76 produces signals of different polarity, of which the mean value is zero. Thereby the spin vector of the gyro rotor 16 is, in the mean, unaffected by the scanning signals.

The scanning can take place in different ways.

Figure 2:
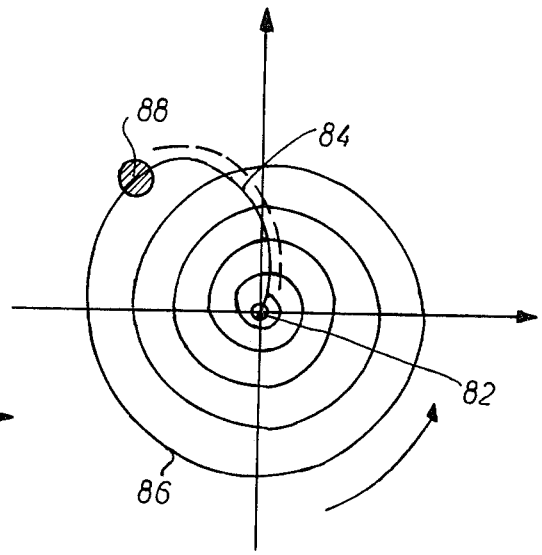

The scanning signal generator 76 can be designed to produce a temporary scanning signal at the beginning of each scanning cycle, by which signal the gryro rotor 16 is deviated out of its stationary position 82 and stimulated to a rotary motion of its geometrical axis 34. When the mean value of the scanning signal is zero, as mentioned above, then the spin vector of the gyro rotor 16 remains stationary with respect to space and the geometrical axis 34 rotates about this spin vector. This rotary motion of the geometrical axis 34 is damped by friction and other damping influences, such that the geometrical axis 34 returns along a spiral path to its stationary position. This is illustrated in FIG. 2.

The geometrical axis 34 is deviated out of the stationary position 82 along the path 84 by a scanning signal (stimulating phase). Then the geometrical axis 34 returns along a spiral path 86 to the stationary position 82 (damping phase). Thus the instantaneous field of view 88 scans the field of view of the seeker along this spiral path. The radial deviation measured by the first position sensor 42 and the angular position about the geometrical axis 34 which is determined by the phase relation to the phase reference signals of the second position sensor 44 are assigned as "address" to the detector signals obtained therewith.

Figure 3:
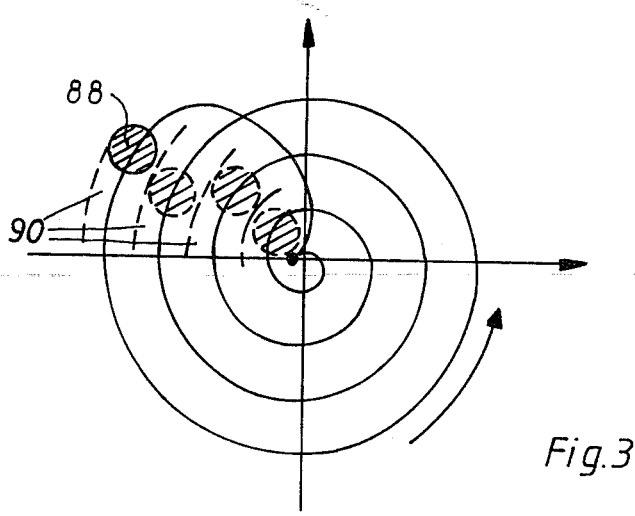
FIGS. 2 to 5 show different patterns of scanning of the field of view of the seeker, which can be achieved with the target seeking head of FIG. 1.

Because the damping phase with low-friction gyros can last rather long, preferably an active damping by currents is provided, which are applied to the annular coil through the feedback loop 80. As illustrated in FIG. 3, this damping can be dimensioned such that a nearly linear fading of the rotary motion of the geometrical axis 34 results, thus, that the field of view of the seeker is scanned by the instantaneous field of view 88 in adjacent strips 90.

Figure 7:
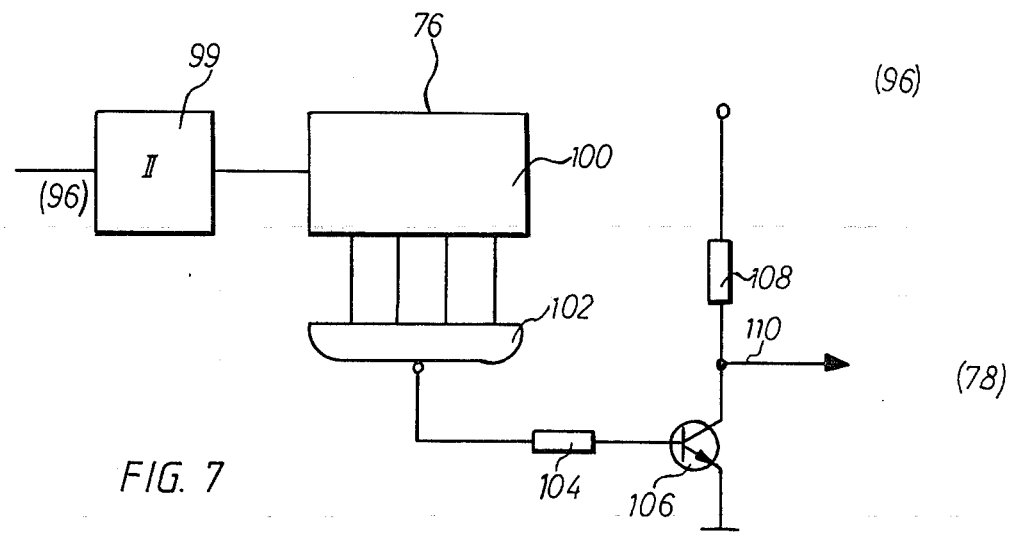
FIG. 7 is a simplified illustration of an embodiment of the scanning signal generator of FIG. 6.

FIG. 7 shows an embodiment of the scanning signal generator 76.

The phase reference signal from the position sensor 44 amplified by the amplifier 70, is applied to the scanning signal generator 76 through conductor 98 (FIG. 6). This phase reference signal is applied to a Schmitt-trigger 99, which provides well-defined counting pulses. The counting pulses are counted into a four-stage binary counter 100. The states of the four counting stages are applied to the four inputs of a NAND-gate. The output of the NAND-gate 102 is connected through a resistor 104 to the base of a transistor 106. The collector of the transistor 106 is connected through a resistor 108 to the control input 96, to which a more or less high voltage is applied depending on the amplitude desired.

The counter 100 obtains a counting pulse during each rotation. Its counting stages change their states in the course of 16 revolutions from 0000 to LLLL, L representing a binary "one". The output of the NAND-gate remains "L" and the transistor 106 remains conductive until the counter reading LLLL is achieved after the fifteenth revolution of the gyro rotor 16. Then the output of the NAND-gate becomes "0" and the transistor 106 is rendered non-conductive. Then the voltage, which is applied to the control input 96, appears at the output 110 of the scanning signal generator 76 connected to the summing point 78. The transistor 106 remains non-conductive until the counter 100 jumps again to 0000 after the sixteenth revolution. A pulse-like scanning signal appears each sixteenth revolution of the gyro rotor 16. The duration of the scanning signal corresponds exactly to one revolution of the gyro rotor and the amplitude is determined by the voltage at the control input 96. The gyro rotor 16 is deflected in well-defined manner by such a pulse. Then it returns to the initial state due to the damping. Because the pulse is acting for exactly the duration of one complete revolution of the gyro rotor 16, the mean value of the torques exerted on the gyro rotor 16 is zero. The gyro spin vector retains its position.

Figure 8:
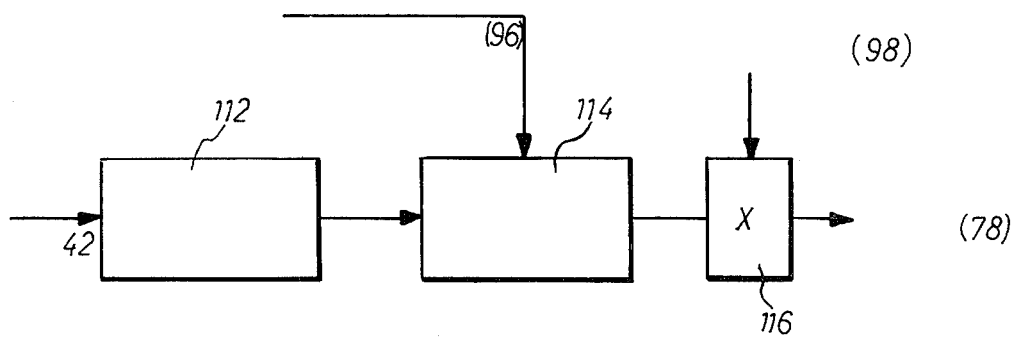
FIG. 8 is a simplified illustration of an embodiment of the feedback loop of FIG. 6.

The motion of the gyro rotor 16 is damped by the feedback loop 80 in well-defined manner, such that its geometrical axis returns to its initial position co ciding with the gyro spin vector within the fifteen revolutions. This feedback loop 80 is illustrated in FIG. 8.

The signal of the position sensors 42 is applied to a differentiator 112 and electricaly differentiated. The differentiated signal is applied to a variable-gain amplifier 114, of which the gain is variable by the signal at the control input 96. The signal thus amplified is modulated or multiplied, respectively, by the phase reference signal from conductor 98 by a modulator or multiplier 116. The signal thus obtained is applied to the summing point 78 with negative sign. This signal causes a damping of the scanning motion of the gyro rotor. The damping factor is dependent on the amplification and can be influenced by the control input 96.

Figure 4:
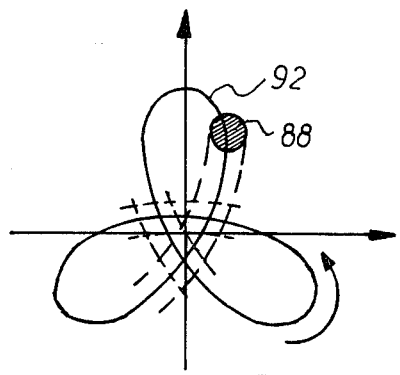
Figure 5:
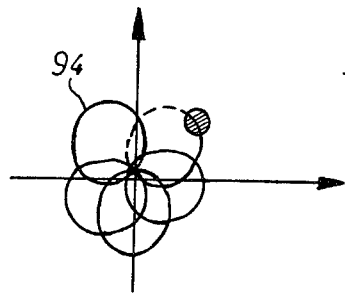

Another possibility for producing a scanning motion is the continuous stimulation of the gyro rotor 16 by a harmonic scanning signal, which is applied to the annular coil 40 by the scanning signal generator 76. Such a stimulation results in a rosette-shaped path 92, or 94, as it is illustrated in FIGS. 4 and 5. The feedback loop 80, evaluating the signals from the position sensors 42 and 44, taking care, that a stable and reproducible path results.

Such a rosette scanning offers, amongst others, the advantage that a target detected near the center point is swept over more or less by all loops of the rosette. The deviation of the target with respect to the center point can be derived from the detector signals received and the assigned adresses with rather low expenditure, and the target seeking device can be readjusted correspondingly. The scanning frequency can be selected rather high, such that also fast target motions can be followed.

Instead of a rosette scanning a scanning along an appropriate path can be achieved by appropriate waveform of the scanning signals.

While the controlled spiral scanning as set forth in FIG. 3 is, above all, adapted for seeking a defined solid angle range for detecting the target, the target pursuit proper, that is the readjusting of the target seeking head 14 to the target, can be effected by means of a rosette scanning as set forth in FIG. 4 or 5. An automatic change-over from one way of scanning to the other can take place, when, for example, the target has been guided into a certain central area of the field of view of the seeker.

In both cases, a controlling signal can be applied to the scanning signal generator 76 and the feedback loop through a control input 96, by which signal the amplitudes of scanning signal and feedback signal are variable for changing the scanned field of view of the seeker. This makes it possible to adapt the size of the scanned field of view of the seeker to the size of the target image, such that the signals can be evaluated for example independently of the distance between target and missile. For this purpose the signal at the control input 96 can be made dependent on the evaluation of the detector signal by the signal evaluating circuit 60.

A third possibility for producing a scanning motion is to cause a nutation motion of the gyro by a single torque pulse, such that the geometrical axis describes a circular motion rotating with the nutation frequency. If care is taken, at the same time, that the optics deviates from the gyro geometrical axis by a small angle, just as large as the opening angle of the nutation motion, a superposed scanning motion results, which is composed of a circular nutation motion with the rotary frequency of the nutation and of an also circular motion, caused by the oblique position of the optical axis, which rotates with the gyro speed of rotation. Nutation frequencey and gyro speed of rotation are different from each other and determined by the ratio of main moment of inertia to transverse moment of inertia. Both spiral-shaped as rosette-shaped scanning figures can be achieved by appropriate dimensioning of the gyro.

The advantage of this method is that the expenditure for the control is minimum and no more torques are exerted on the gyro after the stimulation which torques, with erroneous signal application could cause drifts. The oblique position of the optical axis can be achieved easily by an inclined secondary mirror.

We claim:
1. Target seeking device comprising:
   a gyro rotor rotating about its geometrical axis, which rotor is mounted in a way permitting a angular motion of the geometrical axis with two degrees of freedom about a central point of rotation,
   a detector arranged stationary with respect to the housing in the central point of rotation,
   an optical system arranged on the gyro rotor, by which a field of view of the seeker located in infinity is imaged as field of view image in the plane of the detector,
   means for producing a relative motion between field of view image and detector,
   a signal evaluating circuit to which the detector signals are applied and which is designed to produce follow-up signals as a function of the target deviation,
   means for producing a precession motion of the gyro rotor, to which means the follow-up signals are applied for readjusting the gyro rotor to a target, and
   position sensors, which respond to the angular position of the geometrical axis of the gyro rotor relative to the housing,
   characterized in that
   (a) a torquer (40) acting on the gyro rotor (16) is provided as means for producing a relative motion between field of view image and detector (24), to which torquer scanning signals of a scanning generator (76) are applied and which exerts torques on the gyro rotor (16), the gyro rotor (16) under the influence of said torques executing a motion scanning the field of view of the seeker,
   (b) the signals of the position sensors (42, 44) resulting from this motion are applied to a torquer (40) through a feedback loop (80) and
   (c) the signals of the position sensors (42, 44) together with the detector signals are applied to the signal evaluating circuit (60) for producing the follow-up signals.

2. Target seeking device as set forth in claim 1, characterized in that the scanning signal generator (76) produces signals of different polarity, of which the mean value is zero.

3. Target seeking device as set forth in claim 2, characterized in that the scanning signal generator (76) is designed to produce a temporary scanning signal at the beginning of each scanning period, by which signal the gyro rotor (16) is deflected from a stationary position (82) and stimulated to a rotating motion of its geometrical axis (34), the gyro rotor (16) returning to its stationary position (82) dampedly on a spiral path.

4. Target seeking device as set forth in claim 3, characterized in that a well-defined damping signal is permitted to be applied to the torquer (40) by the position sensors (42, 44) through the feedback loop (80).

5. Target seeking device as set forth in claim 2, characterized in that the scanning signal generator (76) is designed to produce a harmonic scanning signal, of which the amplitude and frequency are selected, such that a rosette-like motion of the geometrical axis (34) of the gyro rotor 16 and a corresponding scanning of the field of view of the seeker are caused.

6. Target seeking device as set forth in anyone of the claims 1 to 5, characterized in that
   (a) the gyro rotor (16) is radially magnetized and surrounded by an annular coil stationary with respect to the housing and serving as torquer (40),
   (b) as well the follow-up signal from the signal evaluating circuit (60) and the scanning signal from the scanning signal generator (76) and a signal connected in opposition to this scanning signal are applied through the feedback loop (80) to the annular coil,
   (c) a first position sensor (42) responds to the angle between geometrical axis (34) and a longitudinal axis (20) stationary with respect to the housing, and a second position sensor (44) supplies a phase reference signal in accordance with the rotary motion of the gyro rotor (16) about its geometrical axis (34), (d) scanning signal generator (76) and feedback loop (80) are controlled by the phase reference signals and are designed to produce pulse-like or harmonic signals in well-defined phase relation to the phase reference signals and (e) the follow-up signals are applied through a controller (58) at the input of which the signal of the first position sensor (42) is connected in opposition to the follow-up signal and which also is controlled by the phase reference signals and designed to produce pulse-like or harmonic signals in well-defined phase relation to the phase reference signals.

7. Target seeking device as set forth in claim 6, characterized in that a control signal is applied to the scanning signal generator (76) and the feedback loop (80), by which control signal the amplitudes of scanning signals and feedback signal are variable for changing the scanned field of view of the seeker.

8. Target seeking device as set forth in claim 1, characterized in that (a) the scanning signal generator is designed to produce short, pulse-shaped scanning signals, which initate a nutation motion of the geometrical axis of the gyro rotor with a well-defined opening angle, and (b) the optical axis of the optical system arranged on the gyro rotor form the said well-defined opening angle with the geometrical axis.

* * * * *